(No Model.)
E. A. E. MEYER.
METHOD OF STARCHING WASHED GOODS.
No. 348,762. Patented Sept. 7, 1886.
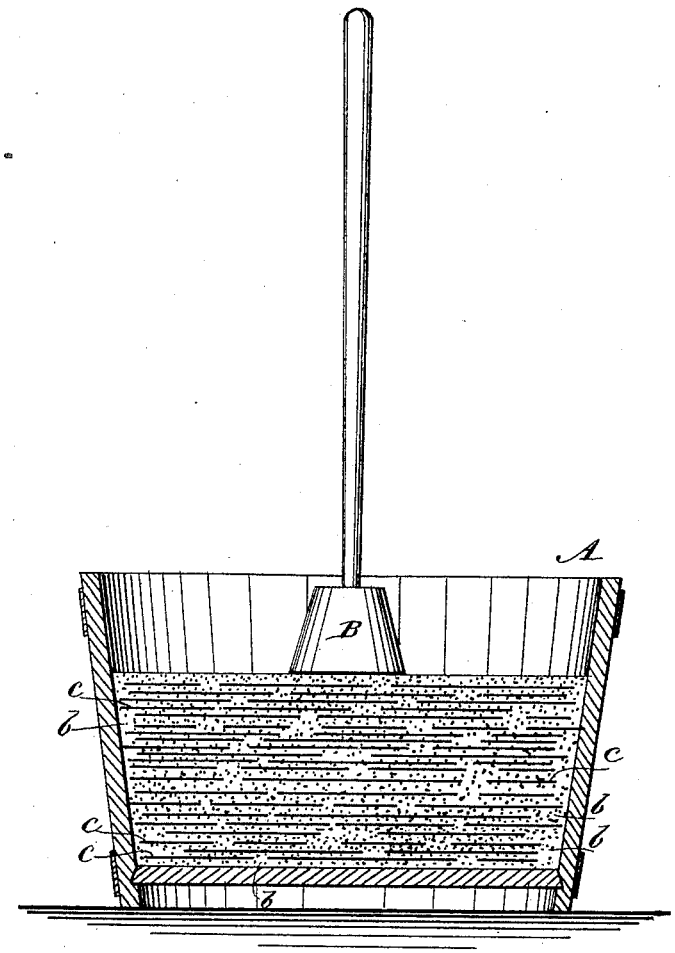

UNITED STATES PATENT OFFICE.

ERNEST A. E. MEYER, OF WATERTOWN, NEW YORK.

METHOD OF STARCHING WASHED GOODS.

SPECIFICATION forming part of Letters Patent No. 348,762, dated September 7, 1886.

Application filed October 19, 1885. Serial No. 180,309. (No model.)

*To all whom it may concern:*

Be it known that I, ERNEST A. E. MEYER, of Watertown, in the county of Jefferson and State of New York, have invented a new and Improved Method of Starching Washed Goods, of which the following is a full, clear, and exact description.

Reference is to be had to the accompanying drawing, forming part of this specification, in which the figure represents a mainly sectional elevation of certain means in illustration of my improved method of starching goods.

A is a tub, or it may be the portion of a barrel or other stationary receptacle of any desired size and shape, into which the hot starch and cuffs and collars or other goods to be starched are placed. In this stationary receptacle I first put a layer, $b$, of hot starch, then a layer of collars and cuffs or other goods, $c$, to be starched; next a layer of starch, $b$, again, and then another layer of goods, $c$, and so on until a sufficient amount of goods and starch has been accumulated in the receptacle. I then take a common clothes or any other suitable pounder, B, and, working it up and down and about, pound or drive and beat the starch into the goods. This may be done either by working the pounder by hand or by machinery; but in every case a mechanical pounding device is used.

This method of starching washed goods, especially collars and cuffs, will be found to do the work much more rapidly and effectually than it is practicable to do by hand direct, or by complicated and expensive starching-machines.

I am aware that articles have been starched heretofore by placing them in a steam-heated rotary cylinder provided with a series of balls. The articles and starch were placed indiscriminately in the cylinder, which was then rotated to cause the balls to fall on the articles and drive the starch into them, and I do not claim the same as of my invention.

Having thus described my invention, what I claim as new, and desire to secure by Letters Patent, is—

The within-described method of starching collars, cuffs, and other washed goods, which consists in building up within a suitable stationary receptacle alternate layers of hot starch and the goods to be starched, and then driving or beating the starch into the goods by mechanically pounding the whole mass within the receptacle, substantially as specified.

ERNEST A. E. MEYER.

Witnesses:
J. B. UPHAM,
J. S. COON.